United States Patent [19]

Nishimura et al.

[11] 4,181,211
[45] Jan. 1, 1980

[54] PALLET EXCHANGE APPARATUS FOR MACHINE TOOL

[75] Inventors: Hideo Nishimura, Nagoya; Kenji Nomura, Chita; Fumihiko Ohkoshi, Anjo; Akira Tsuboi, Kariya; Yoji Kamiya, Anjo; Kazuo Eguchi, Ichinomiya; Kunimichi Nakashima, Anjo, all of Japan

[73] Assignee: Toyoda-Koki Kabushiki-Kaisha, Kariya, Japan

[21] Appl. No.: 908,663

[22] Filed: May 23, 1978

[30] Foreign Application Priority Data

May 26, 1977 [JP] Japan ................................ 52-61604

[51] Int. Cl.$^2$ ............................................. B23Q 7/02
[52] U.S. Cl. ................................. 198/339; 198/472; 269/57; 414/744
[58] Field of Search ................. 198/339, 346, 472; 269/57; 29/33 P, 563; 414/744 (U.S. only); 214/1 BC

[56] References Cited

U.S. PATENT DOCUMENTS

| | | | |
|---|---|---|---|
| 3,825,245 | 7/1974 | Osburn et al. | 198/472 X |
| 3,986,617 | 10/1976 | Blomquist | 198/339 X |

Primary Examiner—Jeffrey V. Nase
Attorney, Agent, or Firm—Oblon, Fisher, Spivak, McClelland & Maier

[57] ABSTRACT

In a pallet exchange apparatus for a machine tool, a rotary member carried to be rotatable in a horizontal plane mounts thereon a pallet support means which in turn supports a pallet unloaded from the machine tool and a pallet to be loaded into the machine tool. Each pallet is provided with an engaging hook. A transfer member is provided with a transfer hook engageable with the engaging hook to move the pallet to be loaded on the machine tool toward the machine tool. A fixed hook is provided to be engageable with the engaging hook. The rotary member is rotated to move the engaging hook of the pallet to be loaded on the machine tool into engagement with the transfer hook and to move the engaging hook of the pallet unloaded from the machine tool into engagement with the fixed hook.

8 Claims, 4 Drawing Figures

PALLET EXCHANGE APPARATUS FOR MACHINE TOOL

BACKGROUND OF THE INVENTION

1. Field of the Invention

The present invention relates to a pallet exchange apparatus for automatically loading a pallet into a work table of a machine tool and for automatically unloading the pallet from the work table.

2. Description of the Prior Art

Various types of pallet exchange apparatus are widely used in machine tools with automatic tool changers. One of the known pallet exchange apparatus comprises a rotary table located adjacent to the work table of the machine tool. The rotary table supports, at one pallet supporting area, a pallet A with an unmachined workpiece and receives, at the other pallet supporting area, a pallet B with a machined workpiece from the work table. The rotary table is subsequently rotated 180 degrees and then transfers the pallet A into the work table.

In such a pallet exchange apparatus, the loading of the pallets A and B into and the unloading thereof from the work table are made by actuators mounted on the rotary table. Therefore, these actuators mounted on the rotary table are rotated together with the pallets through the rotational movement of the rotary table. In such a pallet exchange apparatus, two independent actuators are required for the loading and unloading, respectively.

SUMMARY OF THE INVENTION

It is therefore an object of the present invention to provide a pallet exchange apparatus capable of commonly using a single transfer member and a single feed drive means for the loading and the unloading of the pallets.

Another object of the present invention is to provide a pallet exchange apparatus of the character set forth above, wherein a transfer member for transferring a pallet is supported on a fixed portion and a transfer hook of the transfer member is successively engaged with each pallet through the rotary movement of the rotary member.

Another object of the present invention is to provide a pallet exchange apparatus of the character set forth above, wherein safety covers are provided to prevent an operator from entering into the path of movement of the rotary member.

Briefly, according to the present invention, these and other objects are achieved by providing a pallet exchange apparatus for a machine tool, as mentioned below. A rotary member is carried on a base to be rotatable in a horizontal plane. A pallet support means is mounted on the rotary member for movably supporting on opposite ends thereof a pallet unloaded from the machine tool and a pallet to be loaded into the machine tool. Each pallet is provided with an engaging hook. A transfer member is movably supported on a support member mounted on the base and is formed at one end thereof with a transfer hook engageable with the engaging hook. A bracket member is mounted on the support member and is provided at one end thereof with a fixed hook engageable with the engaging hook. A drive means is provided for rotating the rotary member a predetermined angular amount to move the engaging hook of the pallet to be loaded on the machine tool into engagement with the transfer hook and to move the engaging hook of the pallet unloaded from the machine tool into engagement with the fixed hook of the bracket member. A feed means is also provided for moving the transfer member a predetermined amount to move the pallet to be loaded on the machine tool toward the machine tool.

The pallet exchange apparatus of the character set forth above further comprises safety covers pivotably supported on the base, a link means pivotably connected to the safety covers, and an operating means connected to the link means for operating the same to keep the safety covers opened, when the rotary member is rotated by the drive means.

BRIEF DESCRIPTION OF THE DRAWINGS

The foregoing and other objects and many of the attendant advantages of the present invention will be readily appreciated as the same becomes better understood by reference to the following detailed description, when considered in connection with the accompanying drawings, in which.

DETAILED DESCRIPTION OF THE PREFERRED EMBODIMENT

Figure 1:
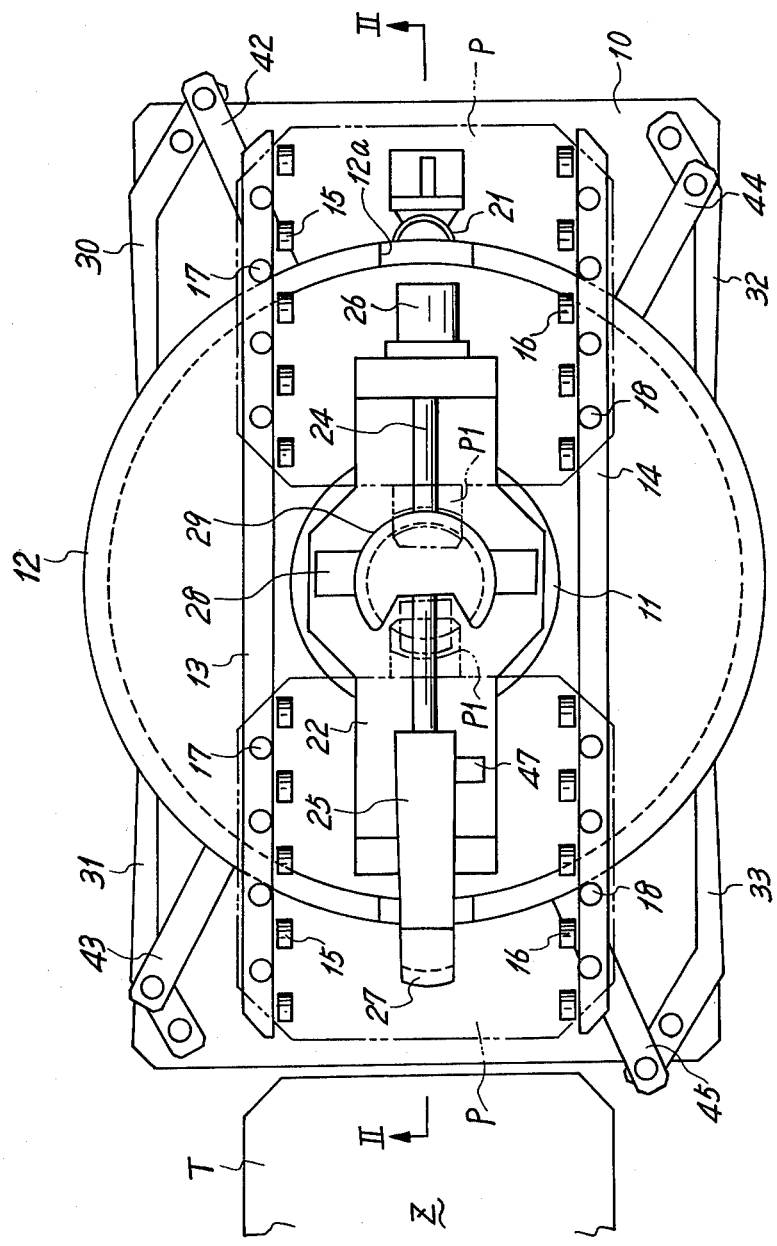
FIG. 1 is a plan view of a pallet exchange apparatus according to the present invention.
Figure 2:
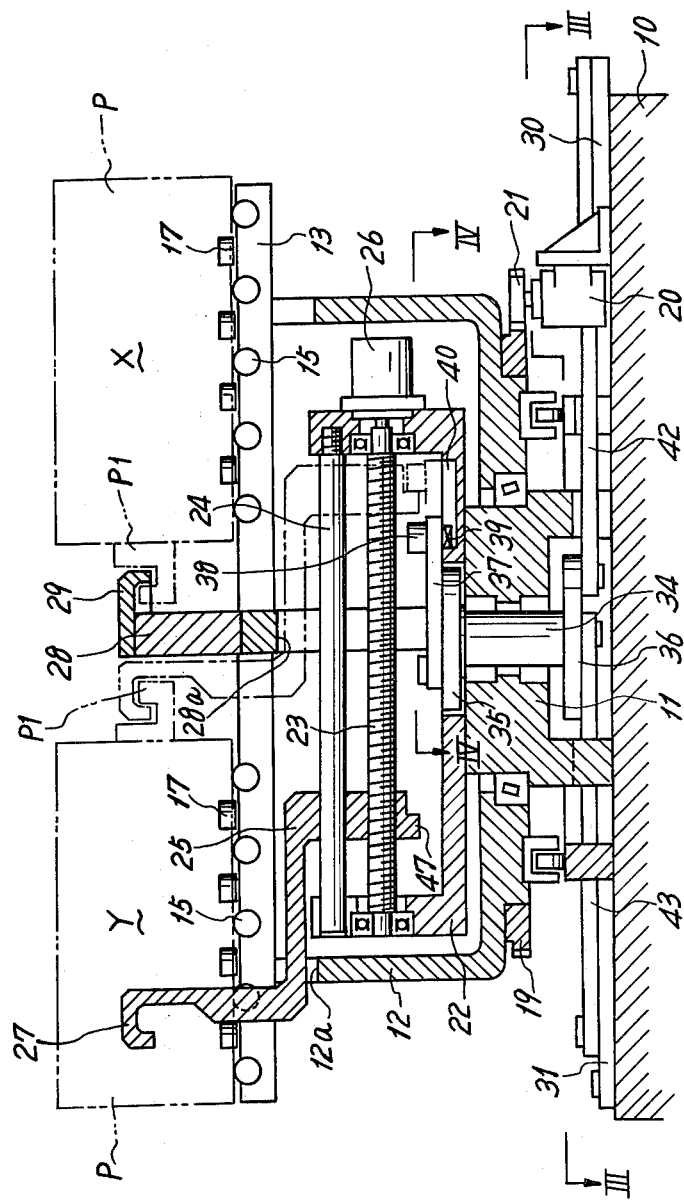
FIG. 2 is a sectional view taken along the lines II—II in FIG. 1.

Referring now to the drawings, wherein like reference numerals or characters refer to identical or corresponding parts throughout the several views, and more particularly to FIGS. 1 and 2, there is shown a base frame 10 of a pallet exchange apparatus. The base frame 10 is of a box type and located adjacent to a work table T of a machine tool. Upon the upper central portion of the base frame 10 is mounted a cylindrical support base 11 which supports a cylindrical rotary member 12 to be rotatable in a horizontal plane. A pair of horizontal support rails 13 and 14 are mounted on the rotary member 12 in parallel relationship with each other and spaced the same distance from the rotary axis of the rotary member 12. The pair of support rails 13 and 14 are provided at their inside opposite surfaces with support rollers 15 and 16 and at their upper opposite surfaces with guide rollers 17 and 18, respectively, to slidably support a pallet P. A gear 19 is secured on the periphery of the underside of the rotary member 12 and is engaged with a gear 21 connected with a drive motor 20 which is, in turn, mounted on the base frame 10. The rotary member 12 is adapted to be rotated 180 degrees by the drive motor 20 to transfer or exchange the two pallets P supported on the opposite ends of the support rails 13 and 14 between a workpiece loading-unloading position X where a workpiece, not shown, is loaded on and unloaded from the pallet, and an exchange position Y.

A support bracket 22 of U-shape in cross section is mounted on the support base 11 in such a manner as to be enclosed by the rotary member 12 and rotatably supports a feed screw shaft 23 at its upstanding portions. A guide shaft 24 is also supported by the upstanding portions of the support bracket 22 in parallel relation with the feed screw shaft 23. A transfer member 25 is threadedly engaged with the feed screw shaft 23 and is slidably supported by the guide shaft 24. A drive motor 26 is secured to one of the upstanding portions of the support bracket 22 to rotate the feed screw shaft 23 to thereby move the transfer member 25 a predetermined distance along the guide shaft 24. The transfer member 25 is provided at its one end with a transfer hook 27, of an inverted U-shape in cross section, which is projected beyond the support rails 13 and 14, and engageable with a U-shaped engaging hook P1, secured to the one side of each pallet P, to move the pallet P between the exchange position Y on the support rails 13 and 14 and the work table T through the predetermined movement of the transfer member 25. The rotary member 12 is provided at its top surface with diametrically opposite recesses 12a to allow the movement of the transfer hook 27 of the transfer member 25 outside the rotary member 12. A bracket 28 is mounted on the support bracket 22 and is provided with an opening 28a to allow the movement of the transfer member 25 therewithin along the guide shaft 24. The bracket 28 is further provided at its top end with a fixed hook 29 of an inverted U-shape in cross section. The fixed hook 29 is engageable with the engaging hook P1 of the pallet P carried at the position X on the support rails 13 and 14 to restrain the movement of the pallet P along the support rails 13 and 14. The engaging portion of the fixed hook 29 is partly in a circular shape with the same axis as that of the rotary member 12, as shown in FIG. 1. The engaging portion of the transfer hook 27 is also partly in a circular shape, in complementary relationship with the engaging portion of the fixed hook 29, and is concentrically aligned with the engaging portion of the fixed hook 29 at the retracted end of the transfer member 25, as indicated in phantom lines in FIGS. 1 and 2. Accordingly, when the rotary member 12 and the support rails 13 and 14 are rotated under the state that the transfer member 25 is at its retracted end, the engaging hook P1 of the pallet P to be rotated from the position X to the position Y is removed from the fixed hook 29 and brought into engagement with the transfer hook 27. On the other hand, the engaging hook P1 of the pallet P to be rotated from the position Y to the position X is removed from the transfer hook 27 and brought into engagement with the fixed hook 29. The transfer member 25 is normally positioned at its original position, as indicated in solid lines in FIGS. 1 and 2.

Figure 3:
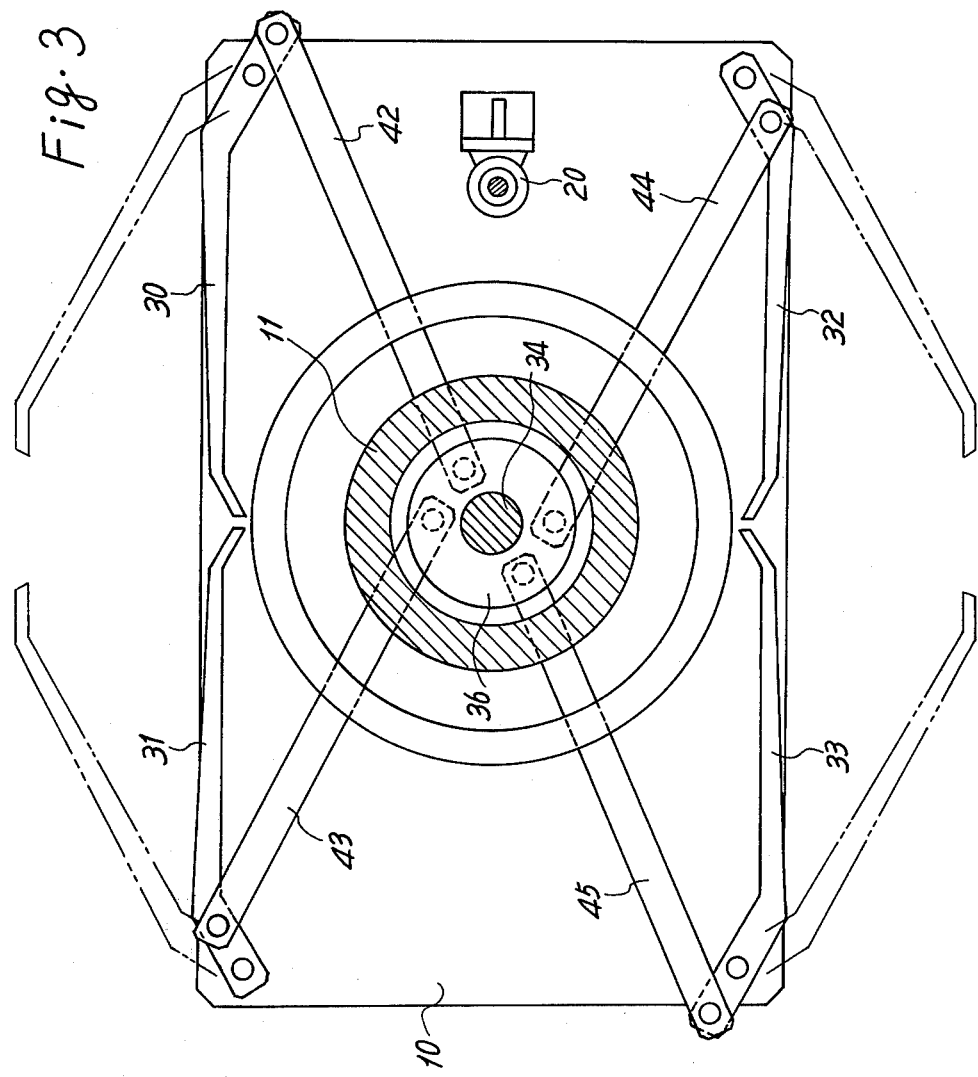
FIG. 3 is a sectional view taken along the lines III—III in FIG. 2.

As shown in FIG. 3, safety covers 30, 31, 32 and 33 are pivotably supported on the respective four corners of the base frame 10 to be opened and closed. The opening and closing of these safety covers 30 to 33 are controlled in connection with the movement of the transfer member 25.

Figure 4:
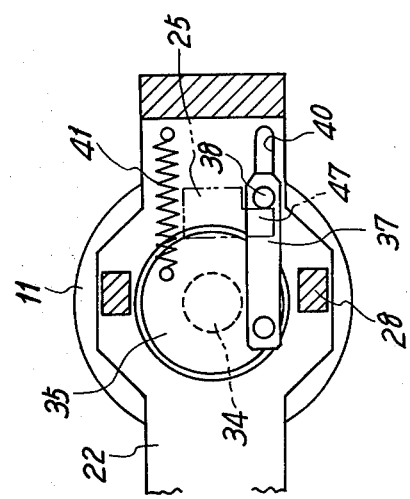
FIG. 4 is a sectional view taken along the lines IV—IV in FIG. 2.

More specifically, a rotary shaft 34 is rotatably supported on the support base 11 in a concentric relationship with the rotary member 12 and is provided at its opposite ends with upper and lower flange portions 35 and 36. A link member 37 is pivoted at its one end to the upper flange portion 35 at an eccentric position a predetermined distance from the center of the rotary shaft 34, as shown in FIG. 4. The other end of the link member 37 rotatably supports an engaging pin 38 projected therefrom. The engaging pin 38 is provided at its lower end with a key member 39 which is slidably received within an engaging groove 40 formed on the bottom of the support bracket 22 in parallel relation with the axis of the feed screw shaft 23. A tension spring 41 is disposed between the upper flange portion 35 and the bottom of the support bracket 22 to render a clockwise rotational moment, as viewed in FIG. 4, to the upper flange portion 35 to thereby normally maintain the rotary shaft 34 at its original position where the key member 39 of the engaging pin 38 is engaged with the one end of the engaging groove 40.

Four connecting links 42, 43, 44 and 45 are pivoted at their one ends to the lower flange portion 36 at predetermined angular positions and pivotally connected at their other ends to the safety covers 30 to 33 through respective openings formed on the support base 11. With this connecting link mechanism, the safety covers 30 to 33 are closed at the original position of the rotary shaft 34 to allow an operator to have access around the base frame 10.

The engaging pin 38 on the link member 37 is provided within the path of movement of the transfer member 25 which has an engaging block 47 engageable with the engaging pin 38. Accordingly, when the transfer member 25 is retracted near its retracted end, the engaging block 47 is brought into abutting engagement with the engaging pin 38 to move the same therewith. Movement of this engaging pin 38 causes a counterclockwise rotation, as viewed in FIG. 4, of the rotary shaft 34 against the tension spring 41, to thereby open the safety covers 30 to 33 outwardly of the base frame 10 through the connecting links 42 to 45. The degree of the opening of the safety covers 30 to 33 is determined to be large enough to prevent an operator from entering into the path of rotary movements of the support rails 13 and 14 and the pallets P carried thereon.

The operation of the pallet exchange apparatus as constructed above will now be described. The drawings show all component parts at their original positions. It is assumed that the pallet P carrying an unmachined workpiece thereon is supported on the support rails 13 and 14 at the position X, but no pallet P is supported at the position Y.

Under these conditions, when a predetermined machining operation is completed on a workpiece carried on the pallet P which is clamped at the work table T of the machine tool, the work table T is moved into the pallet loading-unloading position Z adjacent to the exchange position, as shown in FIG. 1. The drive motor 26 is thereafter operated to advance the transfer member 25 along the guide shaft 24 to the left from its original position, as viewed in FIG. 2. Movement of the transfer member 25 is stopped at its advanced end where the transfer hook 27 of the transfer member is aligned with the engaging hook P1 of the pallet P on the work table T. The pallet P on the work table T is thereafter lifted a predetermined amount to be unclamped so that the engaging hook P1 of the pallet P is moved into engagement with the transfer hook 27 of the transfer member 25. Subsequently, the drive motor 26 is again operated to retract the transfer member 25 so that that the pallet P on the work table T is moved toward the exchange position X on the support rails 13 and 14.

During the retracted movement of the transfer member 25, the engaging block 47 of the transfer member 25 is brought into abutting engagement with the engaging pin 38 on the link member 37 to move the same therewith along the engaging groove 40. Movement of the engaging pin 38 causes a counterclockwise rotation, as viewed in FIG. 4, of the rotary shaft 34 against the spring 41 to thereby open the safety covers 30 to 33 prior to the rotational movement of the rotary member 12. Accordingly, the operator is prevented from entering into the path of rotary movement of the support rails 13 and 14. When the transfer member 25 is retracted to its retracted end, the pallet P with the machined workpiece is located at the exchange position Y and the engaging portion of the transfer hook 27 is aligned at the same circumferential position as that of the fixed hook 29.

The drive motor 20 is subsequently operated to rotate the rotary member 12 and the support rails 13 and 14 through 180 degrees to exchange two pallets P on the support rails 13 and 14 between the positions X and Y. During this exchange operation, the pallet P having been engaged by the fixed hook 29 is disengaged therefrom and brought into engagement with the transfer hook 27 and the pallet P having been engaged by the transfer hook 27 is disengaged therefrom and brought into engagement with the fixed hook 29.

Thereafter, the drive motor 26 is again operated to advance the transfer member 25 to move the pallet P with the unmachined workpiece from the exchange position Y to the pallet loading-unloading position Z on the work table T. Advance movement of the transfer member 25 causes clockwise rotation, as viewed in FIG. 4, of the rotary shaft 34 by the aid of the tension spring 41 to thereby close the safety covers 30 to 33 through the connecting links 42 to 45. The pallet P loaded on the work table T is moved down for positioning and clamping so that the engaging hook P1 of the pallet P is disengaged from the transfer hook 27. Thereafter, the drive motor 26 is again operated to retract the transfer member 25 to its original position, as indicated in solid lines in FIG. 2, and the work table T is moved to a predetermined position for a machining operation on a workpiece on the pallet P.

While a machining operation is being performed by the machine tool, the machined workpiece is unloaded from the pallet P at the position X and a fresh unmachined workpiece is loaded thereon by the operator. In this loading and unloading operation, the safety covers 30 to 33 are held closed to enable the operator to have access to the pallet P from three directions, which results in a remarkable operational efficiency.

Obviously, numerous modifications and variations of the present invention are possible in light of the above teachings. It is to be understood, therefore, that within the scope of the appended claims, the invention may be practiced otherwise than as specifically described herein.

What is claimed as new and desired to be secured by Letters Patent of the United States is:

1. A pallet exchange apparatus for a machine tool comprising:
   a base;
   a rotary member carried on said base to be rotatable in a horizontal plane;
   pallet support means mounted on said rotary member for movably supporting on opposite ends thereof a pallet unloaded from said machine tool and a pallet to be loaded into said machine tool, each pallet being provided with an engaging hook;
   a support member mounted on said base;
   a transfer member movably supported on said support member and formed at one end thereof with a transfer hook engageable with said engaging hook;
   a bracket member mounted on said support member and provided at one end thereof with a fixed hook engageable with said engaging hook;
   drive means for rotating said rotary member a predetermined angular amount to move said engaging hook of the pallet to be loaded on said machine tool into engagement with said transfer hook and to move said engaging hook of the pallet unloaded from said machine tool into engagement with said fixed hook of said bracket member; and
   feed means for moving said transfer member a predetermined amount to move the pallet to be loaded on said machine tool toward said machine tool.

2. A pallet exchange apparatus for a machine tool comprising:
   a base;
   a cylindrical support base mounted on said base;
   a cylindrical rotary member rotatably journalled on said support base to be rotatable in a horizontal plane;
   pallet support means mounted on said rotary member for movably supporting on opposite ends thereof a pallet unloaded from said machine tool and a pallet to be loaded into said machine tool, each pallet being provided with an engaging hook;
   a support member mounted on said support base in such a manner as to be enclosed by said rotary member;
   a transfer member movably supported on said support member and formed at one end thereof with a transfer hook engageable with said engaging hook;
   a bracket member mounted on said support member and provided at one end thereof with a fixed hook engageable with said engaging hook, and formed with an opening for permitting movement of said transfer member;
   drive means for rotating said rotary member a predetermined angular amount to move said engaging hook of the pallet to be loaded on said machine tool into engagement with said transfer hook and to move said engaging hook of the pallet unloaded from said machine tool into engagement with said fixed hook of said bracket member; and
   feed means for moving said transfer member a predetermined amount to move the pallet to be loaded on said machine tool toward said machine tool.

3. A pallet exchange apparatus as claimed in claim 2, wherein said transfer hook and said fixed hook are so formed as to permit rotation of said engaging hook relative thereto.

4. A pallet exchange apparatus as claimed in claim 3, wherein said pallet supports means comprises a pair of parallel support rails mounted on said rotary member, and a plurality of support rollers provided on said support rails to movably support a pallet.

5. A pallet exchange apparatus as claimed in claim 3, wherein said rotary member has a pair of diametrically opposite recesses for permitting movement of said transfer hook of said transfer member outside the periphery of said rotary member.

6. A pallet exchange apparatus as claimed in claim 5, further comprising:
   a feed screw shaft rotatably supported on said support member and threadedly engaged with said transfer member; and
   a guide shaft supported by said support member to slidably guide said transfer member.

7. A pallet exchange apparatus as claimed in claim 2, further comprising:
   safety covers pivotably supported on said base;

link means pivotably connected to said safety covers; and operating means connected to said link means for operating the same to keep said safety covers opened, when said rotary member is rotated by said drive means.

8. A pallet exchange apparatus as claimed in claim 7, wherein said operating means comprises:

a rotary shaft rotatably supported on said support base in a concentric relationship with said rotary member and provided with upper and lower flange portions;

a link member pivoted at one end thereof to the upper flange portion of said rotary shaft at a position eccentric from the center of said rotary shaft;

an engaging pin rotatably supported on the other end of said link member and provided with a key member slidably received within an engaging groove formed on said support member;

the lower flange portion of said rotary shaft being pivotably connected to said link means;

said rotary shaft being adapted to be rotated in one direction during the movement of said transfer member in one direction by engagement thereof with said engaging pin so as to open said safety covers; and spring means for urging said rotary shaft in the other direction.

* * * * *